United States Patent [19]

Barsted

[11] 4,234,060
[45] Nov. 18, 1980

[54] BRAKE EQUIPMENT

[75] Inventor: Roger Barsted, Burton-on-Trent, England

[73] Assignee: Coal Industry (Patents) Limited, London, England

[21] Appl. No.: 920,502

[22] Filed: Jun. 29, 1978

[30] Foreign Application Priority Data

Jul. 1, 1977 [GB] United Kingdom ............... 27631/77

[51] Int. Cl.³ .............................................. F16D 65/06
[52] U.S. Cl. ...................................... 188/44; 188/170
[58] Field of Search ....................... 188/41–44, 188/136, 170, 188, 189

[56] References Cited

U.S. PATENT DOCUMENTS

| 2,970,445 | 2/1961 | Suderow | 188/44 X |
| 3,643,765 | 2/1972 | Hanchen | 188/170 |
| 3,741,349 | 6/1973 | Banks | 188/42 |
| 3,777,857 | 12/1973 | Hughes | 188/170 |
| 4,014,413 | 3/1977 | Monks | 188/44 X |

*Primary Examiner*—Duane A. Reger
*Attorney, Agent, or Firm*—James Creighton Wray

[57] ABSTRACT

Brake equipment for a vehicle or mining machine which in use traverses along a path adjacent to a stationary rail comprises a rail engaging component including a wedge assembly resilient means for urging the rail engaging component into a 'brake applied' mode contacting the rail and ram means for urging the rail engaging component into a 'brake released' mode out of contact with the rail. The brake equipment includes further ram means for urging the wedge assembly out of a rail engaging position when the brake is released.

8 Claims, 6 Drawing Figures

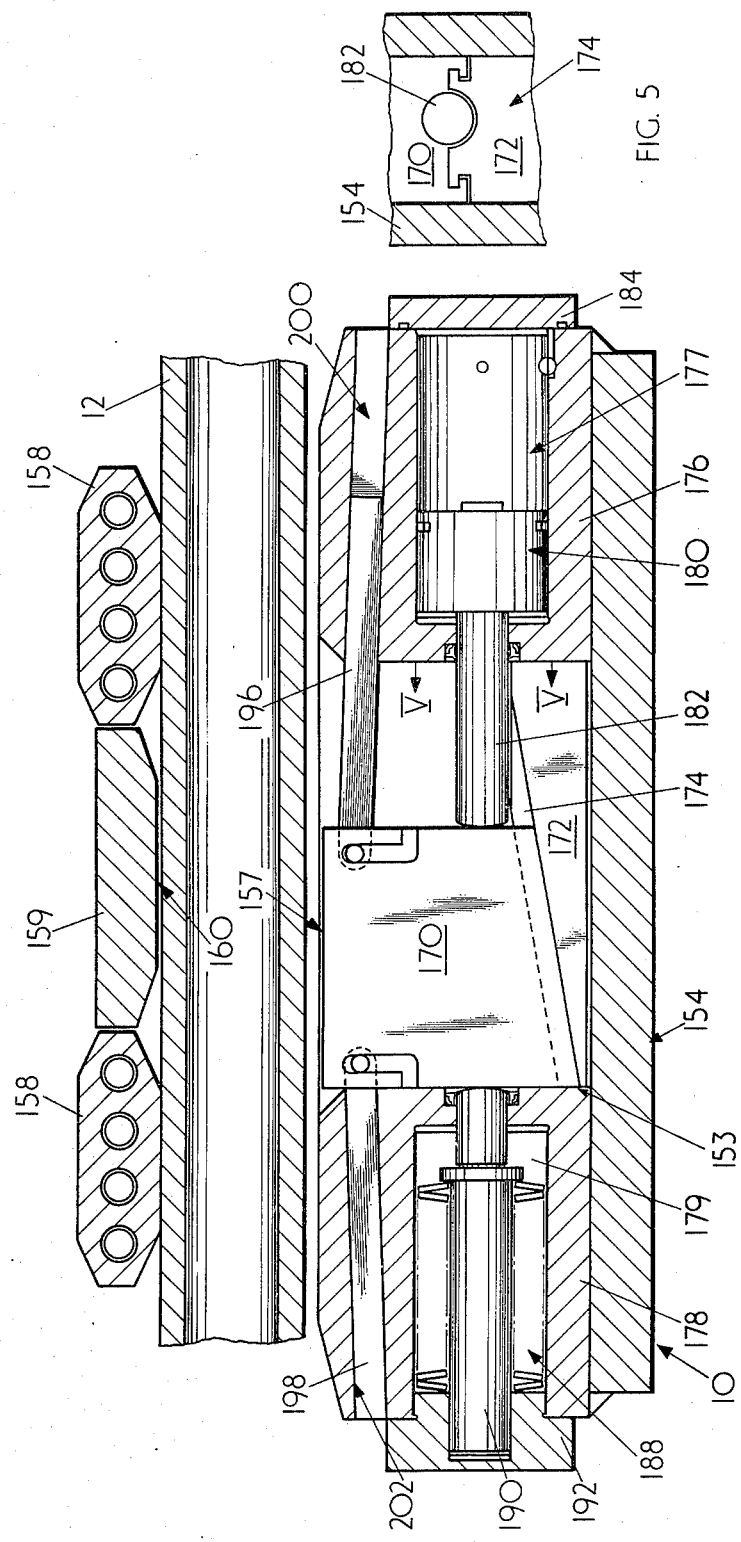

BRAKE EQUIPMENT

This invention relates to brake equipment and is an improvement in or a modification of the invention described and claimed in our prior British patent application No. 27729/74 now British Pat. No. 1,488,374 and U.S. Pat. No. 4,014,413.

There is claimed in the above numbered patent specification brake equipment for a vehicle which in use moves along a path adjacent to an anchored rail, comprising a number of co-acting brake elements slidable along the rail, resilient means for urging at least one of the brake elements into contact with the rail and fluid actuated means for urging the said brake element out of braking contact with the rail, said at least one of the brake elements including a wedge assembly having a brake pad which, in use, upon contacting the rail is urged by relative movement of wedge components in the wedge assembly to increase the braking force of the brake equipment on the rail.

An object of the present invention is to provide improved brake equipment.

According to the present invention, brake equipment for a vehicle or mining machine which in use traverses along a path adjacent to a stationary anchored rail, comprises a number of co-acting brake elements slidable along the rail, resilient means for urging at least one of the brake elements into contact with the rail and fluid actuated means for urging the said at least one of the brake elements out of braking contact with the rail, said at least one of the brake elements including a wedge assembly having a rail engaging component which, in use, upon contacting the rail is urged by relative movement of the wedge components in the wedge assembly to increase the braking force of the brake equipment on the rail, the wedge assembly comprising further fluid actuated means for urging the wedge assembly out of a rail engaging position when the brake is released.

Preferably, the wedge assembly comprises a resilient bias for urging the wedge assembly towards a rail engaging position.

Conveniently, the rail engaging component is constituted by one of the wedge components.

Advantageously, the two wedge components are slidably connected by a slideway.

Preferably, the two wedge components are mounted intermediate two blocks which carry the further fluid actuated means and the resilient bias, respectively.

Preferably, when the brake equipment is in the 'brake released' mode the braking face of the rail engaging component is more remote from the rail than the corresponding faces on the blocks.

The invention also provides brake equipment as defined above in combination with a vehicle or mining machine.

By way of example only, one embodiment of the present invention will be described with reference to the accompanying drawings, in which:

FIG. 4 is a sectional view substantially along line IV—IV of FIG. 3;

FIG. 5 is a scrap view along line V—V of FIG. 4; and

Figure 1:
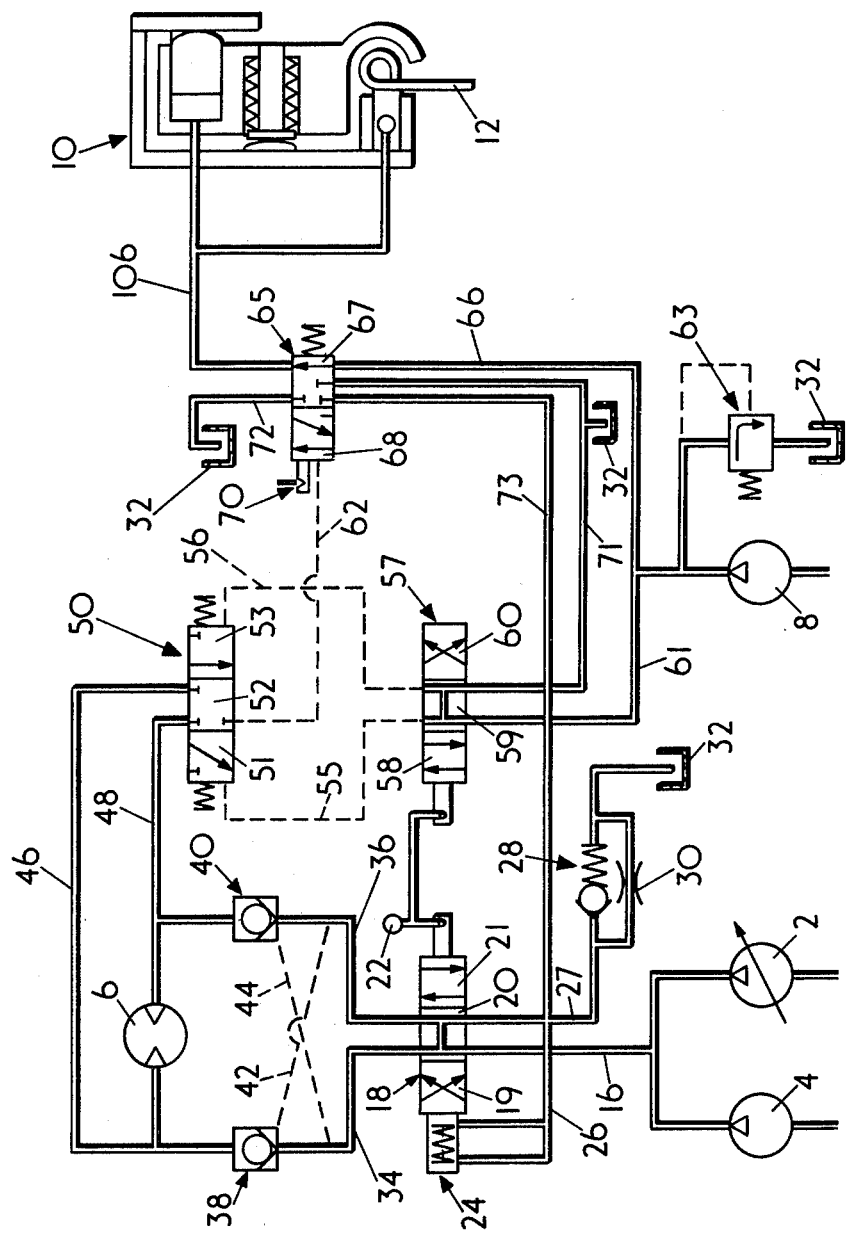
FIG. 1 is a hydraulic circuit diagram of brake equipment for a mining machine.

FIG. 1 shows part of a hydraulic circuit diagram of a mineral mining machine (not shown) which in operation traverses to and fro adjacent to a longwall face, mining mineral from the working face by means of a rotating cutter (not shown) cutting the mineral from the working face and simultaneously loading the cut mineral onto a conveyor which extends along the length of the longwall face and along which the machine is guided.

The mineral mining machine comprises an electric motor (not shown) which drives two pumps 2 and 4 for feeding pressure fluid to a hydraulic haulage motor 6 for hauling the machine along the longwall face and a third pump 8 for feeding pressure fluid to a brake 10 engagable with a stationary rail 12 extending along the longwall face adjacent to the conveyor. The brake 10 is described in more detail later in this specification with reference to FIGS. 3, 4, 5 and 6.

Typically, the motor 6 drives a component (not shown), for example, a sprocket or endless chain arranged to drivably engage a stationary chain or track extending along the length of the longwall face. Pump 2 is a variable delivery pump and drives the haulage motor 6 during cutting operations when the machine traverses along the longwall face at relatively slow speed. The pump 4 is not driven during cutting operations but assists the pump 2 when the machine is fitted along the face at relatively high speed. During flitting the cutter does not normally engage the mineral and therefore permits the machine to travel at relatively high speed.

Pressure fluid is fed from pumps 2 and 4 via feed line 16 to a manually actuated control spool valve 18 for controlling direction of rotation of the haulage motor 6 and thus direction of machine traverse along the longwall face. The control valve 18 has three operational modes, forward, neutral and reverse denoted by 19, 20 and 21, respectively, and is manually actuated via a control lever 22. Actuation of the control valve 18 also is effected by operation of a spring biassed pilot arrangement 24 acting on the spool of the control valve 18 so as to urge the control valve into its neutral mode 20 should pressure of fluid in exhaust lines 26 and 27 fall below a preselected level normally determined by a spring biassed stop valve 28 in line 27. The spring biassed pilot arrangement 24 which is not shown in detail comprises a dual piston assembly which is displaced into a non-effective position against the action of the spring bias by pressure fluid in lines 26 and 27 at the preselected level but which is moved into its effective position by the spring bias when the pressure in lines 26 and 27 falls below the preselected level. Movement of the dual piston assembly into its effective position causes the control valve 18 to move into its neutral operational mode 20 to exhaust pressure fluid fed along line 16 from the pump 2 or pumps 2 and 4 to exhaust line 27.

A restrictor 30 is provided in parallel with the stop valve 28 to allow controlled leakage of fluid to tank 32 and prevent a hydraulic lock condition occurring in the exhaust lines.

Actuation of the control valve 18 into one or other of its operative modes 19 or 21 feeds pressure fluid from feed line 16 along line 34 or 36 depending upon which operative mode is selected to drive the haulage motor 6 in the desired direction, the line 36 or 34 providing the exhaust line from the haulage motor, two pilot operated non-return valves 38 and 40 are provided in the lines 34 and 36 to sense the pressure of fluid in lines 36 and 34, respectively via pilot lines 42 and 44 such that the stop valves 38 and 40 are open only when the sensed fluid pressure in the associated line 36, 34 is above a preselected level. Thus, should the pressure in line 34 or 36 fall below the preselected level then the stop valve 40, 38 will close to prevent further exhaust of fluid from the haulage motor 6.

Lines 34 and 36 are connected via lines 46 and 48 to a spring biassed pilot operated spool valve 50 which has three operational modes, 51, 52, and 53 and which is actuated in accordance with pilot pressure fed along pilot lines 55 and 56 from a further control spool valve 57 having three operational modes 58, 59 and 60 which is mechanically linked to the control lever 22 of main control valve 18 so that the valve 57 is a slave to the main control valve 18 always moving with the main control valve. When in one of its end operative modes 51 or 53 the valve 50 is arranged to feed pilot pressure along pilot line 62 to actuate a further spring biassed valve 65 which is arranged to control feed of pressure fluid along line 66 from the pump 8 to the brake 10. The valve 65 which is described in detail with reference to FIG. 2 has two operational modes 67 and 68 and is moved by pilot pressure above a preselected level acting against its spring bias to change the valve from its normal operational mode 67 feeding pressure fluid to the brake 10 to its mode 68 in which pressure fluid is shut off from the brake 10 allowing application of the brake under its spring loading. Details of the brake 10 are described later in this specification with reference to FIGS. 3, 4, 5 and 6. Once the valve 65 is moved into the mode 68 it is retained in this mode against its spring bias by a detent 70 which thereafter must be manually reset to allow the valve to return its mode 67. The valve 65 is connected directly to tank 32 via line 72 and to the previously mentioned exhausted line 27 via line 73.

The valve 57 is connected to the pump 8 via line 61 which is a branch line of line 66, the pressure in lines 61, 66 being limited to below a preselected high level by a relief valve 63. The valves 57 and 65 are connected by line 71.

Figure 2:
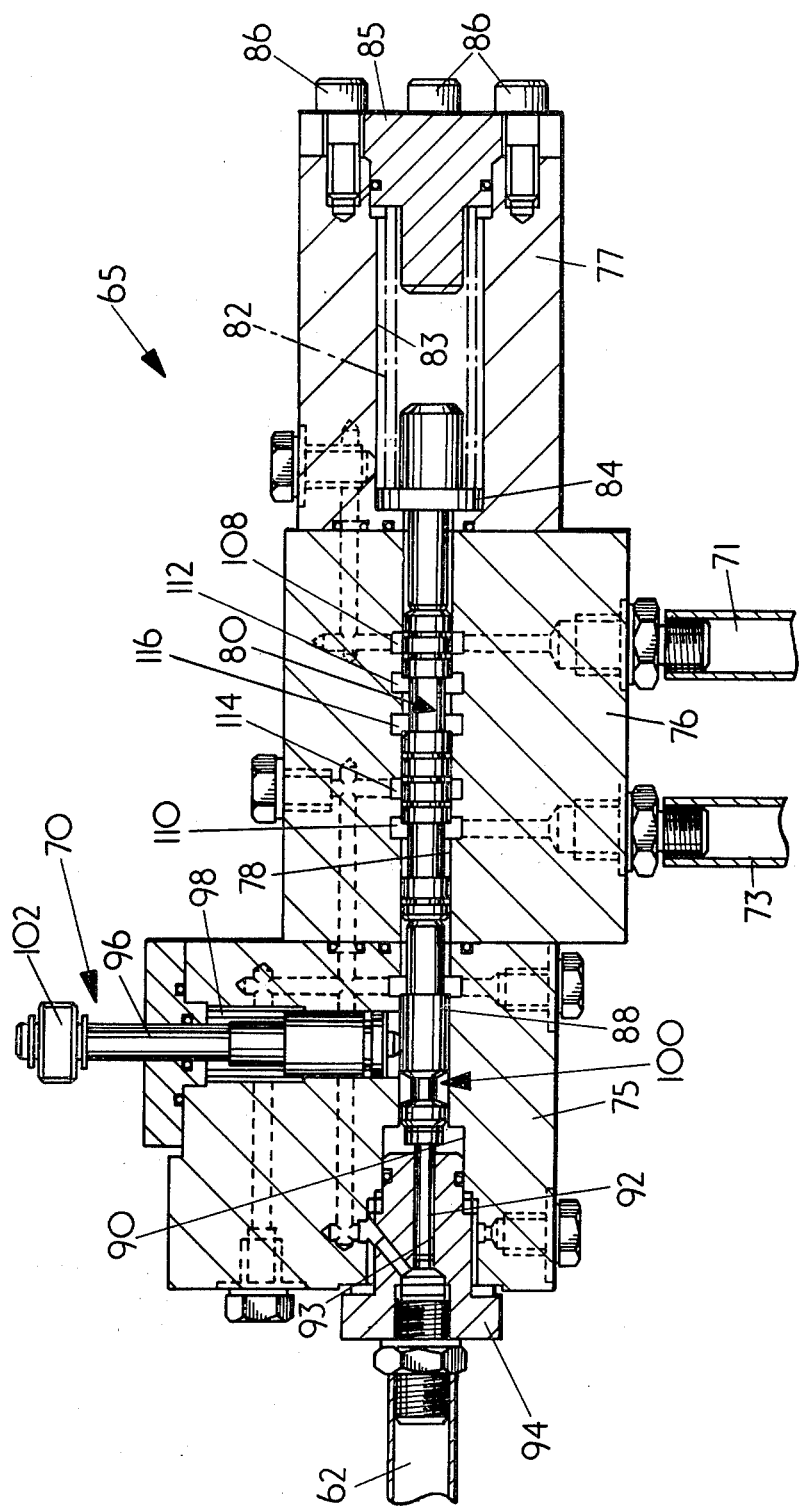
FIG. 2 is a sectional view of a detail of FIG. 1, shown on an enlarged scale.

Referring now to FIG. 2 which shows the spring biassed pilot operated spool valve 65 in section and in more detail. The valve 65 comprises a body housing assembly made up of three portions 75, 76 and 77 sealably secured together by bolts (not shown) and having a longitudinal bore 78 slidably accommodating a stepped spool 80, the larger diameter sections of which sealably engage around the bore wall. The spool 80 is urged along the bore towards the left (as seen in FIG. 2) by a coil spring indicated by broken line 82 and arranged within a bore 83 and having an end cap 84 slidably engaged within the bore 83 and a further end cap 85 retained by bolts 86 to the housing portion 77. The bore 83 is co-axial with bore 78.

The other end of spool 80 is abutted by a stepped plunger 88 which is slidably and sealably accommodated within a stepped bore 90 arranged co-axial with the bore 78 and which in turn is abutted by a plunger 92 slidably and sealably mounted in a bore 93 of a plug 94 connected to the pilot line 62 from valve 50. Thus, in operation pilot pressure in line 62 is sensed by the plunger 92 so that when the pilot pressure reaches a preselected high level (determined by the pre-setting of spring 82) the plunger 92 is moved to the right (as seen in FIG. 2) against the action of spring 82, causing the plunger 88 and spool 80 to move to the right to change the operational mode of the valve 65 from 67 to 68. Once the plunger 88 has moved to the right (as seen in FIG. 2) a spring loaded plunger 96 of the detent 70 moves under the action of its spring 98 to engage in a recess 100 formed in the plunger 88 to thereby retain the plunger 88 and thereby the spool 80 in the operational mode 68. The plunger 96 can be manually reset by raising the plunger against its spring bias until it is clear of the recess 100 to free the plunger 88. The plunger 96 is provided with a handle 102.

The central housing portion 76 of the valve 65 is provided with five connector ports (only two of which are shown in FIG. 2) for connection to lines 66, 71, 72, 73 and 106, the latter of which connects the valve to the brake 10. As seen in FIG. 2 the lines 71 and 73 are connected via bores in the housing to annular recesses 108 and 110, respectively, associated with the bore 78. In addition lines 106, 72 and 66 (not shown in FIG. 2) are connected via bores in the housing to annular recesses 112, 114 and 116, respectively, also associated with the bore 78. As seen in the drawings, in operational mode 67, the spool 80 is in a position to connect recesses 112 and 116 to connect lines 66 and 106 to feed pressure fluid to the brake 10. The other recesses are isolated from one another. When the spool 80 is moved to the right (as seen in the drawing) into the position associated with operational mode 68, recesses 110 and 114, and 108 and 112, are connected to pass fluid in lines 26, 27, 73 and 106 directly to tank 32. Recess 116 is isolated to close line 66 and pressure fluid from the pump 8 is passed to tank via pressure relief valve 63.

FIGS. 3, 4, 5 and 6 show the brake 10 which in use is fixedly attached to the machine as it traverses to and fro along the longwall face and which co-operates with the stationary rail 12 anchored to conveyor equipment 150 (only a spill plate of which is shown).

The brake 10 comprises a casing 154 which bridges the rail 12 and which is provided with brackets 155 (see FIG. 3) having bolt holes 156 for enabling the brake to be attached to the machine. A part of one side of the casing 154 is provided with a wedge arrangement 153 constituting one jaw 157 of a clamp which is adapted to contact the rail 12.

Figure 3:
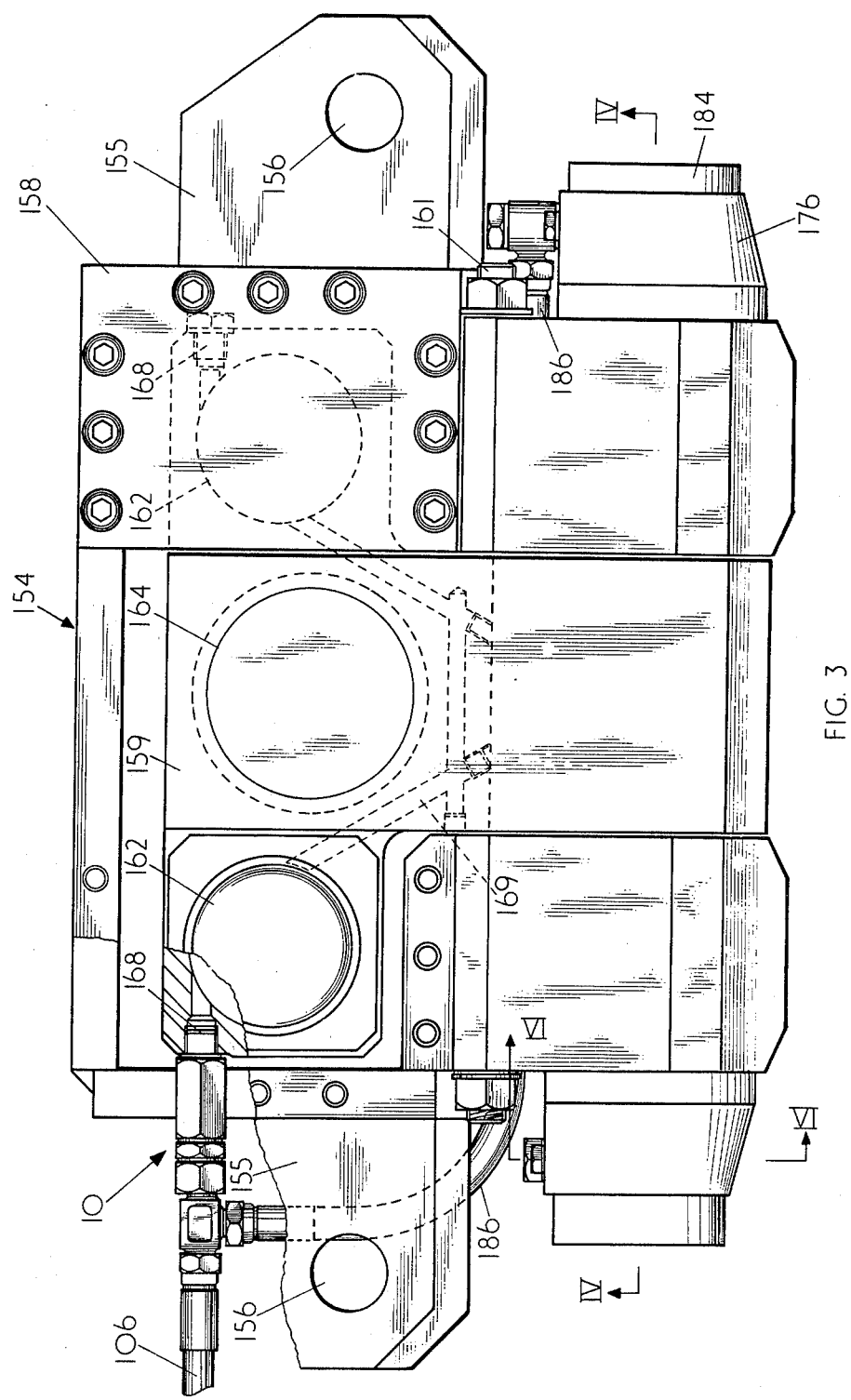
FIG. 3 is a side view (partly cut away) of a further detail of FIG. 1, also shown on an enlarged scale.

The opposite side of the casing is partially closed by two plates 158 (one of which is removed in FIG. 3) rigidly bolted to the casing and by a component 159 which is generally 'T' shaped as seen in FIG. 3 and which has been partly cut away to expose inner details of the brake as described later in this specification. The component 159 has an upright limb extending from between the two plates 158 towards the base of the casing 154 to form the other jaw 160 of the clamp. The jaw 160 has a curved surface corresponding to the cylindrical portion of the rail 12.

The two cross limbs of the 'T' shaped component 159 lie within the casing 154 adjacent to the two plates 158, respectively. The component 159 which is pivotally mounted on a pivot bolt 161 supported at its ends by the casing, has two blind bores which form the cylinders of two rams 162, and has a further blind bore housing disc springs (indicated at 164).

The springs act to urge the jaw 157 including the wedge arrangement 153 towards the rail 12 when the fluid pressure is exhausted from the rams 162 which when actuated by pressure fluid fed along line 106 urge the jaw 157 to move against the spring loading to release the brake. The loading of the springs can be adjusted prior to assembly of the brake by a screw pad arrangement (not shown) mounted within the bore.

Figure 6:
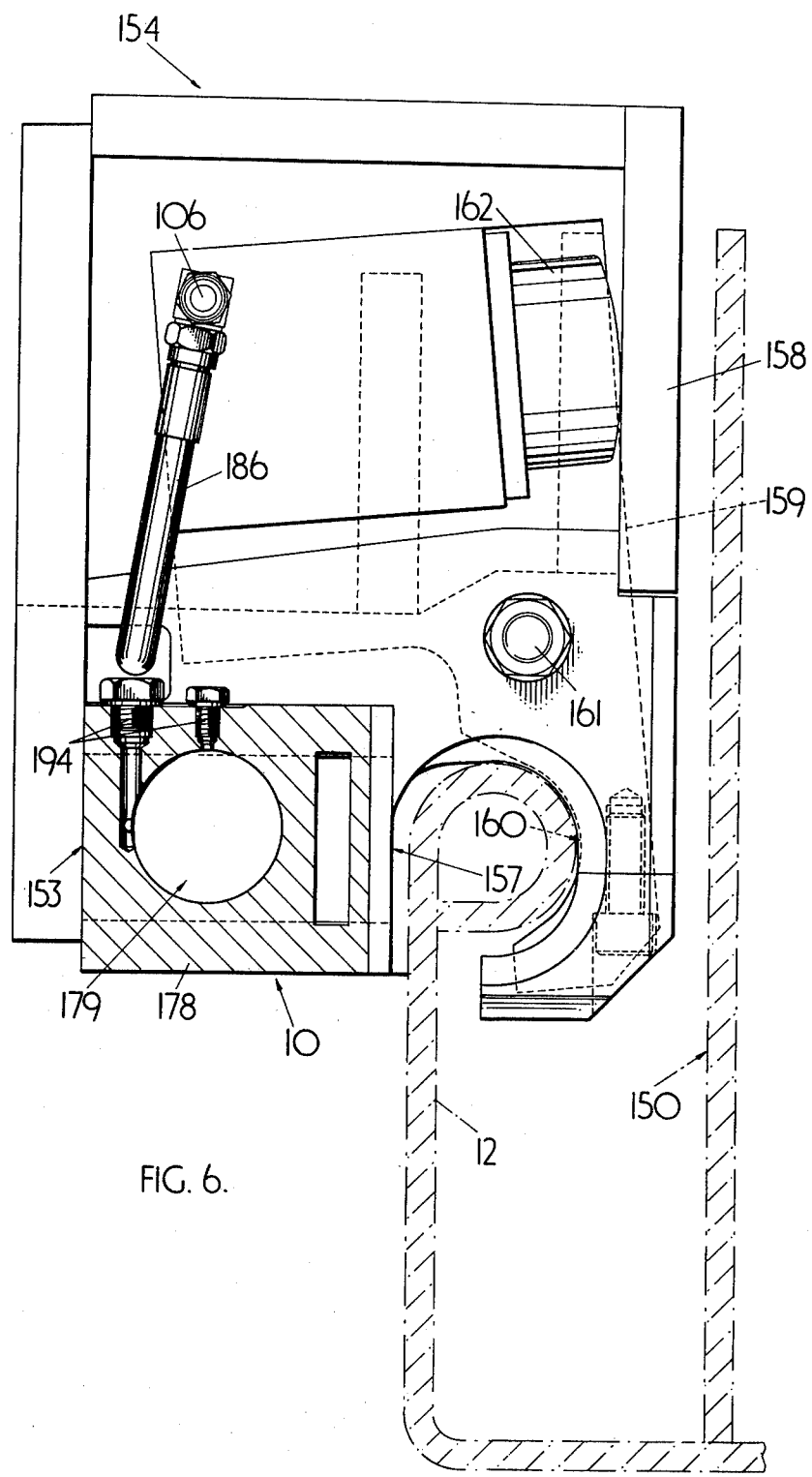
FIG. 6 is an end view partly sectioned along line VI—VI of FIG. 3.

The rams 162 extend from the component 159 and abut the plates 158 (as seen in FIG. 6) so that when fed with pressure fluid along line 106 the rams 162 urge the component 159 to pivot about the bolt 161 (i.e. in an anti-clockwise direction as seen in FIG. 6) against the action of the spring loading to release the clamp from the rail. The energising pressure fluid for the rams 162 is supplied from line 106 through inlets 168 and connecting bores 169 extending along the cross limbs of the component 159.

The wedge arrangement 153 comprises two co-operating wedges 170 and 172 slidably connected to each other by a retaining slideway 174 (see FIGS. 4 and 5). The wedge 172 is fixedly mounted between two blocks 176 and 178 secured to the brake casing 154 and provided with stepped bores 177 and 179, respectively. Bore 177 contains a hydraulic piston 180 having a rod 182 projecting from the bore to abut the movable wedge 170 which thereby, in use, is urged down the slideway 174 towards the block 178. As seen in FIG. 5 the slideway 174 is recessed to accommodate the piston rod 182. The end of the bore 177 is sealably closed by an end cap 184 so that the bore 177 constitutes a cylinder for the piston 180, the cylinder being hydraulically connected through line 186 to the feed line 106.

The bore 179 in block 178 contains a compression spring assembly 188 arranged to urge a plunger 190 into contact with the movable wedge 170 which thereby is urged by the action of the spring assembly towards the right as seen in FIG. 4. The spring assembly 188 is retained in place by an end cap 192. Hydraulic ports 194 shown in FIG. 6 are provided in order that the wedge arrangement 153 can be used with either hand of brake enabling the same brake construction to be adapted for braking the machine in both directions of travel along the face. It will be appreciated that the wedge action of the wedge arrangement 153 will be effective for preventing machine movement in one direction only (i.e. in FIG. 4 machine movement to the left will be prevented when the brake is applied). In FIG. 6 the ports 194 leading to the bore 179 are not required and are closed by blanks to prevent ingress of dirt into the bore.

The movable wedge 170 when in its withdrawn or brake release position (as seen in FIG. 4) has its working or brake surface (denoted by 157) set back slightly from the rail 12 as compared to the corresponding faces on the blocks 176 and 178. This enables the brake to more easily negotiate small projections e.g. protruding retaining pin heads, standing proud of the rail surface. The tapered leading ends of the blocks 176 and 178 permit these items to negotiate such slight projections. Also, the movable wedge 170 is provided with two sliding shutter doors 196 and 198 which are secured to opposite ends of the wedge by pin and slot arrangements and which are drawn out of or pushed into slideways 200 and 202 respectively, as the wedge moves up or down the slideway 174. The shutter doors 196 and 198 prevent dirt from passing into the path of the moving wedge 170 and thereby the path is kept free from obstruction.

In use when the brake is applied and pressure fluid is exhausted from the line 106 the jaw 160 is urged into contact with the rail by the action of the spring loading on the component 159. Further movement of the component relative to the brake casing 154 urges the jaw 157 including the wedge arrangement 153 into contact with the opposite side of the rail. Simultaneously, exhaustion of fluid pressure from the line 186 (which is a branch of line 106) causes the piston 180 to be de-energised and allows movement of the movable wedge 170 up the slideway 174 under the action of the spring 188. Thus, by the time the jaw 157 contacts the rail the wedge 170 has moved sufficiently up the slideway such that it stands proud of the blocks 176 and 178 and contacts the rail. Any tendency of the machine to move to the left as seen in FIG. 4 will tend to urge the wedge 170 further up the slideway 174 and thereby tend to increase the braking force.

When fluid pressure is re-introduced into lines 106 and 186 the jaws 160 and 157 are released from the rail to release the brake and the wedge 170 is urged against the action of its spring loading by the action of piston 180.

It will be appreciated that the above described brake construction leads to a very effective braking action which is able to stop relatively heavy mining machines very quickly to restrict uncontrolled movement of the machine.

In operation, the machine operator switches on the electric motor and starts the three pumps 2, 4 and 8, the main control valve 18 being previously returned to its central neutral mode 20 under the action of the spring biassed pilot arrangement 24 when the fluid pressure in exhaust lines 26 and 27 fell below the previously discussed preselected level. Upon restarting the pumps 2 and 4 the fluid pressure in lines 26 and 27 re-attains the preselected level and the pilot arrangement 24 is actuated to free the spool of the main central valve 18 enabling the operator to actuate the valve by movement of the control lever 22 to select the direction of movement of the machine. For the sake of example, suppose the operator moves the control lever 22 to the left as shown in FIG. 1 to move the control valve 18 into its operative mode 21. In this mode, the control valve 18 feeds pressure fluid along line 34 to drive the haulage motor 6. The stop valve 38 is opened by fluid pressure in line 34 acting directly on the valve. The stop valve 40 in line 36 (currently the exhaust line from the haulage motor) is opened by fluid pressure in line 34 sensed through pilot line 44.

The mechanical link between the main control valve 18 and the slave control valve 57 moves the latter into its operative mode 60 whereby fluid pressure from pump 8 is fed via lines 61 and 56 to the right hand pilot of valve 50 (as seen in FIG. 1) to move the latter into its operational mode 53 and feed fluid pressure along pilot line 62 to act on the plunger 92 of valve 65. At ordinary working pressure the exhaust pressure in lines 36, 48 and 62 is insufficient to move the valve 65 against its spring loading. Consequently, the valve 65 remains in its operational position 67 feeding fluid pressure along lines 66 and 106 to release the brake against its spring loading and allowing the machine to move along the track.

Should the operator return the main control valve 18 to its neutral mode 20 to stop driving the haulage motor 6 the slave valve 57 simultaneously is returned to its neutral position exhausting fluid pressure via line 71 from lines 61, 66 and 106 to permit the spring loading of brake 10 to apply the brake. Thus, when the motor 6 is not driven by pressure fluid from the pump 2 or pumps 2 and 4 the brake is applied to prevent uncontrolled movement of the machine.

When the machine is hauled along the face under the action of the haulage motor 6 it is possible that the reaction of the rotating cutter with the mineral face may tend to try and propel the machine along the longwall face at dangerously high speed. However, with the present invention as soon as the haulage motor tends to be driven at high speed by the action of the rotating cutter acting through the previously mentioned stationary track and the component drivably connected to the haulage motor 6 and drivably engaged with the track, the haulage motor starts to function as a pump and induces pressure fluid from line 34 to line 36 (or vice versa). Thus, fluid pressure in line 34 falls. This fall in pressure is sensed by valve 40 via pilot line 44 which closes to prevent further exhaust of fluid through line 36. Consequently, fluid pressure in line 48 and pilot line 62 increases until the spring loading of the valve 65 is rapidly overcome to allow movement of the spool 80 of the valve 65 to move to operative mode 68 in which line 106 is connected directly to tank removing the supply of pressure fluid from the brake 10 which, thereby, is applied under its spring loading to stop the machine moving at dangerously high speed. The valve 65 is retained in the "brake applied" mode by the action of the detent 70. Simultaneously, line 73 is connected directly to tank destroying the back pressure previously maintained in lines 26 and 27 and in the pilot arrangement 24 valve 18 which thereby causes the main control valve 18 to move into its neutral mode 20 disconnecting the haulage motor from the supply line 16. Hence, when the machine is brought to rest by application of brake 10 the haulage motor 6 cannot recommence hauling the machine until the machine operator has manually reset the detent 70 of the valve 65.

If the rotating cutter tends to propel the machine in the opposite direction to that described above, i.e. in the direction opposite to that in which the haulage motor 6 is hauling the machine along the face, then fluid pressure in the portion of the current feed line 34 between the motor 6 and the stop valve 38 tends to increase. The stop valve 38 is closed by this increase in fluid pressure to cause a hydraulic lock in the portion of line 34 adjacent to the motor and in line 46 which is closed by valve 50 (as previously explained this valve 50 is operational mode 53). Thus, if the rotating cutter tends to propel the machine in the reverse direction to that in which the haulage motor 6 is driving the machine then a hydraulic lock is produced and any resultant increase in pressure tends to oppose reverse movement of the motor and thereby prevent the machine being propelled by the rotating cutter. Should the propelling force be sufficiently great to move the machine in the reverse direction then reverse rotating of the haulage motor 6 would reduce the fluid pressure in the current exhaust lines 36, 26 and 27 to below the preselected level set by relief valve 28 causing the pilot arrangement 24 of the main control valve 18 to move the valve 18 into its neutral operative mode 20. Also, the valve 57 is moved into its neutral mode 59 (because of the mechanical linkage provided between valves 18 and 57) to exhaust pressure fluid from the brake 10 via lines 106, 66, 61 and 71, to cause application of the brake to thereby prevent further uncontrolled movement of the machine along the longwall face.

Thus, it will be seen from the above description that the present invention tends to prevent uncontrolled movement of the machine.

Brake equipment according to the present invention also would be actuated to retard movement of the machine at least in one direction of traverse should the machine tend to be propelled by means other than the rotating drum, for example, by a conveyor extending along the longwall face.

I claim:

1. Brake equipment for a vehicle or mining machine which in use traverses along a path adjacent to a stationary anchored rail, comprising first and second relatively movable jaws respectively providing co-acting first and second brake elements slidable along the rail and respectively mounted on opposite sides of the rail, first resilient means for urging relative movement of the first jaw transversely towards the rail such that, in use, the brake element of the first jaw is urged to contact the rail, and first fluid actuated means for urging the first jaw such that the first brake element is urged out of braking contact with the rail, the second brake element including a wedge assembly having a wedge component and a rail engaging component which, in use, when the second brake element is urged into contact the rail, upon contacting the rail the rail engaging component is urged by relative movement of the components in the wedge assembly to increase the braking force of the second brake element on the rail, the wedge assembly comprising a resilient bias for urging the rail engaging component of the wedge assembly substantially along the rail relative to the wedge component towards a rail engaging position and second fluid actuated means for urging the rail engaging component of the wedge assembly out of a rail engaging position, when, in use, the first fluid actuated means urges the first jaw to urge the first brake element out of braking contact with the rail.

2. Brake equipment as claimed in claim 1, in which two wedge assembly components are slidably connected by a slideway.

3. Brake equipment as claimed in claim 2, in which the two wedge assembly components are mounted intermediate two blocks which carry the further fluid actuated means and the resilient bias, respectively.

4. Brake equipment as claimed in claim 3, in when the brake equipment is in the 'brake released' mode a braking face of the rail engaging component is more remote from the rail than the corresponding faces on the blocks.

5. Brake equipment as claimed in claim 1 in which the rail engaging component is constituted by a second wedge component.

6. Brake equipment as claimed in claim 1 in which both wedge components are slidably connected by a slideway.

7. Brake equipment as claimed in claim 6 in which both wedge components are mounted intermediate two blocks which carry the further fluid actuated means and the resilient bias, respectively.

8. Brake equipment as claimed in claim 7 in which the rail engaging component comprises a braking face for contacting the rail which, when the braking equipment is in a 'brake release' mode, is more remote from the rail than corresponding rail facing faces on the blocks.

* * * * *